United States Patent [19]

Honda et al.

[11] 3,956,436

[45] May 11, 1976

[54] PROCESS FOR PRODUCING MICRO-BEADS AND PRODUCT CONTAINING THE SAME

[75] Inventors: Hidemasa Honda; Yasuhiro Yamada; Hitoo Kakiyama; Takeshi Imamura; Masanao Nakagawa, all of Tosu, Japan

[73] Assignee: Director-General of the Agency of Industrial Science and Technology, Japan

[22] Filed: Apr. 5, 1973

[21] Appl. No.: 348,224

[30] Foreign Application Priority Data

June 29, 1972   Japan................................ 47-65480
June 29, 1972   Japan................................ 47-65481

[52] U.S. Cl....................................... 264/29; 72/42; 106/38.28; 136/122; 176/88; 252/12; 252/29; 252/502; 423/448; 423/450
[51] Int. Cl.²................... B29C 25/00; C01B 31/00; C10M 5/00; C10M 1/10
[58] Field of Search.................... 252/12, 12.2, 12.4, 252/12.6, 25, 29; 423/448, 450; 264/15, 29

[56] References Cited
UNITED STATES PATENTS

| | | |
|---|---|---|
| 2,131,021 | 9/1938 | Bemis .................................... 252/12 |
| 2,486,826 | 11/1949 | Decepoli............................ 252/12.4 |
| 2,487,640 | 11/1949 | Decepoli............................ 252/12.4 |
| 2,964,460 | 12/1960 | Neuworth ............................ 423/450 |
| 3,549,531 | 12/1970 | Santt....................................... 252/12 |
| 3,787,541 | 1/1974 | Grindstaff et al..................... 264/29 |
| 3,812,240 | 5/1974 | Whittaker et al................... 423/448 |

*Primary Examiner*—Delbert E. Gantz
*Assistant Examiner*—I. Vaughn
*Attorney, Agent, or Firm*—William J. Daniel

[57] ABSTRACT

Micro-beads having a carbonaceous structure are produced by a process comprising heating pitch at about 350–500°C to form optically anisotropic spherules, extracting the resulting spherules with an organic solvent to remove substantially all remaining pitch therefrom, and then carbonizing the pitch-free spherules in a non-oxidizing atmosphere. The optically anisotropic micro-beads substantially free of pitch can be shaped to a desired form and then carbonized to produce a shaped carbonaceous structure. If the carbonizing temperature is above about 1500°C, a graphite crystalline structure results.

7 Claims, No Drawings

PROCESS FOR PRODUCING MICRO-BEADS AND PRODUCT CONTAINING THE SAME

BACKGROUND OF THE INVENTION

1. Field of the Invention

This invention relates to an improved process for producing by a simple treatment micro-bends carbonaceous structure and particularly having a graphite cyrstalline structure which are useful as a raw material for high density isotropic carbonaceous materials as well as to a process for producing a high density isotropic carbonaceous structure from said micro-beads.

2. Description of the Prior Art

When a pitch, such as coal tar pitch and petroleum pitch, is heated, formation of optically anisotropic spherules having a diameter of about one micron to several tens of microns is observed when the heating temperature is about 350°–450°C. On further heating, these spherules gradually grow and coalesce with one another until the pitch is finally wholly anisotropic. When the temperature reaches about 500°C, the pitch is completely solidified and changed to coke.

These spherules assume a spherical form since the high molecular weight condensed polycyclic aromatic compound formed by pyrolysis and thermal polymerization of the pitch is oriented in a determined direction to form a lamella which is then laminated spherically. Thus, each spherule is a kind of liquid crystal droplet. As the crystal structure of such spherules is the same as that of graphite, these spherules can be considered to be a precursor for graphite crystal. Therefore, if it is possible to separate these spherules from the pitch matrix in which they are formed and then carbonize the spherules while retaining their crystal structure, one would expect to obtain micro-bends containing graphite crystal. On the basis of such thinking, there was proposed a process in which the surface of spherules separated from a pitch is coated with a resin or subjected to an oxidation treatment so as to prevent the spherules from undergoing mutual coalescence and then the treated spherules are subjected to a carbonization treatment (see Japanese Published Pat. Appln. No. 4513/Sho. 46).

However, the carbonized product obtained by this process has some disadvantages in that deterioration of the graphitizing property of the spherules caused by contamination with impurities and non-homogeneity of the components cannot be avoided. In addition, a high density carbonaceous material cannot be obtained from the carbonized product.

BRIEF SUMMARY OF THE INVENTION

Accordingly, it is an object of this invention to provide a simple process for converting spherules separated from a pitch to micro-beads having a carbonaceous structure, particularly a graphite crystalline structure, without subjecting the spherules to a resin coating treatment or a special surface treatment such as an oxidation treatment.

It is another object of this invention to provide a process for producing carbonaceous micro-beads which can have a graphite crystal structure, the surface of which is coated with an optically isotropic carbonaceous material.

It is still another object of this invention to provide a simple process for producing a high density isotropic carbonaceous material useful in high temperature nuclear reactors, for discharge processing or for mechanical seals.

Other objects, features and advantages of this invention will become apparent more fully from the following description.

GENERAL DESCRITION OF THE INVENTION

It has now been found that when spherules separated from a pitch are substantially freed all the pitch components before carbonization, mutual coalescence does not take place during carbonization even without applying any special coating treatment to the surface thereof.

As the spherules are in plastic state in the heated pitch and the spherules themselves are composed essential of high molecular weight hydrocarbons, it is usually considered that the spherules are molten when heated. It is quite surprising, therefore, that only removal of the pitch components from the spherules results in the elimination of mutual coalescence thereof upon heating.

According to this invention, micro-beads having a graphite structure are obtained by heating a pitch at about 350°–550°C, separating the resulting optically anisotropic spherules from the pitch, removing substantially all of the remaining pitch components by extracting the separated spherules with an organic solvent, and then carbonizing the pitch-free spherules in a non-oxidizing atmosphere. A carbonizing temperature below about 1,500°C gives micro-beads having a non-graphitic carbonaclous structure, whereas a temperature higher than 1,500°C results in the formation of micro-beads having a crystalline graphite structure. Further, the use of a pitch containing no free carbon results in the formation of single-component micro-beads having a graphite crystal structure, whereas the use of a pitch which does contain free carbon gives micro-beads having a graphite crystal structure and coated with an optically isotropic carbonaceous material.

The substantially pitch-free spherules were not molten by heating and the molecular orientation thereof was not changed. When the surface of the spherules was observed with a scanning type electronic microscope, cracks caused by shrinkage were not detected. From these results, it has been found that there are obtained micro-beads having a structure similar to the crystal structure of graphite.

DETAILED EXPLANATION OF THE INVENTION

The starting pitch for producing the optically anisotropic spherules includes coal tar pitch as well as pitches obtained from petroleum heavy residual oils such as petroleum pitch and asphalt. The pitch is subjected to a heat treatment of 350°–500°C. An optimal temperature therefor is 400°–450°C. The duration of the heat treatment varies according to the sort of starting material and the heating temperature but may generally be selected from the range of 0.5–6 hours. A shorter holding time tends to reduce the yield and diameter of the spherules, while an excessively longer holding time causes mutual coalescence of the spherules, thus making it impossible to obtain them in individually discrete state. The use of coal tar pitch containing free carbon or a pitch containing a hetero element such as sulfur in an amount more than about 5% results in the formation of spherules of approximately the same size, whereas the use of other pitches gives spherules having a size of from several microns to several tens of microns. Examples of organic solvents utilizable for separating the spherules from the pitch include quinoline, pyridine, nitrobenzene, tetrahydrofuran, and tar oils such as anthracene oil and creosote oil, with quinoline, pyridine and tar oils being most preferred.

For avoiding melting and coalescence of the spherules on carbonization, it is necessary to extract the spherules with the solvent so as to reduce the content of the remaining pitch to below 1%.

The spherules thus obtained are carbonized in a conventional manner. As described above, either carbonaceous micro-beads or graphitic micro-beads are obtained depending on the carbonizing temperature selected.

Coal tar pitch contains several percent of a spherical material called "free carbon" which has a size of one micron or less and is insoluble in the organic solvent (quinoline). When such a pitch is heated, the optically anisotropic spherules are produced in the pitch and at the same time the free carbon is deposited on the periphery of these spherules. Thus, when the spherules are separated from such pitch, they are coated with free carbon. However, this free carbon is changed to an optically isotropic material when heated at about 550°C in the pitch. In case carbon black is added in place of free carbon to a pitch and spherules are produced therefrom, the carbon black functions similarly to free carbon. It follows that carbonization of spherules coated with free carbon or carbon black results in the formation of micro-bends coated with an optically isotropic material, e.g., a carbonaceous material such as vitreous carbon.

The micro-beads thus obtained with a graphite crystal structure are industrially useful materials. For example, a high density isotropic graphite material for nuclear reactors can be prepared by molding a mixture of the micro-beads as a filler and a pitch as a binder and carbonizing the resulting molded article. In addition, the micro-beads are useful as a filler for the production of electroconductive plastics or as a dispersed phase for dispersion strengthened alloys, dry battery mix, carbon powders for telephone components or metallic graphite electric brushes and contacts. Moreover, the graphitized micro-beads can serve as a lubricating agent for friction material, a mold-releasing agent for casting and die-casting, and a lubricating agent for wire- or pipe-drawing.

On the other hand, a shaped carbonaceous material of good quality can be produced by molding the spherules separated from the pitch and rendered substantially free from all pitch components to a desired shape and firing the molded article for carbonization. The molding and firing treatments in this case can be carried out din a conventional manner.

The spherules in the resultant carbonaceous material retain their shape and have a molecular orientation identical with that of a graphite crystalline structure. Consequently, the individual spherules have a graphite crystalline structure but the overall shaped structure is isotropic since its direction of molecular orientation becomes random. Unlike prior processes for producing carbonaceous material, the process of this invention requires no binder at the time of molding, thus making it possible to minimize any loss in weight of the spherules at the time of firing for carbonization and thereby produce a highly dense carbonaceous material.

By observation of the carbonaceous material of this invention with a polarization microscope, the carbonaceous material can be classified into two different forms according to the state of the spherules used: (1) micro-beads having an optically isotropic carbonaceous material creating interstices between the individual micro-beads which are obtained with the spherules having free carbon or carbon black coated thereon and (2) micro-beads in a densely packed state which are obtained with spherules having no free carbon on their surface. These two kinds of carbonaceous material are different from each other in various physical properties, e.g., the degree of graphitization, electric resistance and magnetic property.

The carbonaceous material of this invention can be produced industrially at a low cost and is very useful. For example, the carbonaceous material of this invention is particularly suitable for a carbonaceous material for atomic piles which require an isotropic carbonaceous material in the form of a block. Further, the carbonaceous material can be used as a slidable carbonaceous plate or rod such as a mechanical seal.

SPECIFIC EXAMPLES OF THE INVENTION

This invention will be illustrated in more detail by way of the following examples.

EXAMPLE 1

A pitch obtained from a residual oil (in the refining of petroleum) was subjected to heating at 430°C for 60 minutes. To the pitch thus treated was added quinoline in an amount of three times the amount of the pitch, and the mixture was heated at 95°C for one hour to effect dissolution and dispersion of the pitch into the quinoline. A quinoline-soluble component was removed by centrifugal separation. To the quinoline-insoluble component was added further quinoline in an amount of three times the amount of insoluble component, and the mixture was treated in the same manner as mentioned above. This operation was repeated three times and then a similar operation was repeated three times at room temperature. The mixture was filtered through a No. 4 glass filter and the insoluble matter was then collected and washed with benzene. Spherules were thus obtained in a yield of 9.5% and with an approximately definite size, i.e., about 3 microns. The content of pitch in the spherules was 1% or less.

The resulting spherules were heated up to 1,000°C in a nitrogen atmosphere at a temperature elevation rate of 3°C/min. to effect carbonization. The resulting product was in the form of powder. Observation of the product with a polarization microscope showed that the molecular orientation of the product was the same as that of the starting spherules. Observation of the product with a scanning type electronic microscope showed that no change occurred on the surface of the product and that no shrinkage cracks caused by carbonization were present on the surface.

Where, for purposes of comparison, the spherules were subjected to only one extraction from the pitch with quinoline, the yield was 13%. When these spherules were heated in nitrogen atmosphere, the periphery of the spherules began to melt at 350°C and coalesced at 400°C, but the whole spherules coalesced at 500°C to become bulky. The content of remaining pitch in the bulky product was 38%.

EXAMPLE 2

Coal tar pitch containing 3.4% of free carbon was subjected to a heating at 430°C for 90 minutes. The resulting pitch was treated in the same manner as described in Example 1 to separate spherules. The yield was 25%. Observation of the spherules with a polarization microscope and a scanning type electronic microscope showed that the surface of the spherules was coated with free carbon. The size of the spherules was definite, i.e., about 10 microns in diameter. The spherules were heated up to 1,000°C in nitrogen atmosphere to effect carbonization. The product thus obtained was powdery. Ovservation of the product with a polarization microscope showed that no change occurred in the molecular orientation of the spherules but the peripheral free carbon was converted into an optically isotropic substance.

EXAMPLE 3

A pitch was obtained by removing quinoline under reduced pressure from the quinoline-soluble component separated from the spherules of Example 2. The presence of free carbon was no longer detected in the pitch. The pitch was subjected to heating at 430°C for 30 minutes and then treated in the same manner as described in Example 1 to obtain 10.5% of spherules which were in the form of a mixture of those having sizes varying from about 1 micron to 100 microns in diameter. The spherules were fired for carbonization at a temperature of up to 1,000°C in nitrogen atmosphere. The product thus obtained was powdery.

EXAMPLE 4

To the pitch obtained in Example 3 was added 5% of carbon black and the mixture was subjected to heating at 430°C for 90 min. To the resulting product was added pyridine in an amount of 10 times the amount of the product and the mixture was heated at 100°C to effect dispersion of the pitch into the pyridine. The mixture was then separated by centrifugal separation into a soluble component and an insoluble component. The same treatment was repeated five times in all for the insoluble component. This extraction treatment was further repeated five times at room temperature. The resulting insoluble component was collected by a No. 4 glass filter and then washed with benzene to obtain spherules coated with carbon black. The resulting spherules were carbonized at a temperature up to 1,000°C to obtain a fine powdery product having an average particle diameter of 7 microns.

EXAMPLE 5

A coal tar pitch containing 3% of free carbon was subjected to heating at 430°C for 90 minutes. To the resulting pitch was added quinoline in an amount of 3 times the amount of the pitch, and the mixture was heated at 100°C for one hour to effect dissolution and dispersion of the pitch into the quinoline. After centrifugal separation of the mixture, a soluble component was removed therefrom. An insoluble component was added to quinoline in an amount of three times the amount of the insoluble component and the extraction operation repeated as before. In all, the extraction operation was repeated three times and the mixture was then filtered through a No. 4 glass filter. An insoluble component held on the filter was thoroughly washed with benzene to remove the quinoline. The resultant spherules having free carbon on their periphery were charged into a mold to effect molding of the spherules under pressure of 1,000 kg. per sq. centimeter. The bulk specific gravity of the resulting molded article was 1.25 g/cc. The molded article was buried in coke powder and fired for carbonization at a temperature up to 1,000°C at a temperature elevation rate of 0.4°C/min. The bulk specific gravity of the carbonized product was 1.63 g/cc. The article was further heated in a graphitizing furnace at 2,800°C to effect graphization of the article. The resulting graphitized article had a bulk specific gravity of 1.78 g/cc and a compression strength of 1,030 kg./cm$^2$. Observation of the graphitized article with a polarization microscope showed that the micro-beads were almost the same in size as before molding and had an average particle diameter of 10 microns.

EXAMPLE 6

Asphalt containing about 5% of sulfur was subjected to heating at 440°C for 30 minutes. The resulting product was treated in the same manner as described in Example 5 to obtain spherules having an average particle diameter of 3 microns. The spherules were molded under pressure of 1,000 kg./cm$^2$. The molded article had a bulk specific gravity of 1.33 g/cc. The article was then baked for carbonization at a temperature up to 1,000°C in the same manner as described in Example 5. The resulting carbonized article had a bulk specific gravity of 1.72 g/cc and a compression strength of 1,230 kg/cm$^2$. Observation of the carbonized article with a polarization microscope showed that the spherical form of the spherules was retained in the product.

EXAMPLE 7

A pitch free of free carbon was obtained by removing quinoline under reduced pressure from the quinoline-soluble component of the pitch of Example 1 from which the spherules had been removed. The resultant pitch was heated at 400°C for 60 minutes and treated with quinoline in the same manner as described in Example 5 to obtain spherules. The resulting spherules were molded under pressure of 1,000 kg./cm$^2$ and baked for carbonization at a temperature up to 1,000°C. The carbonized article had a bulk specific gravity of 1.34 g/cc and a compression strength of 1,150 kg./cm$^2$. Observation of the product with a polarization microscope showed that the product was in the form of a mixture of micro-beads having sizes of about 2 $\mu$ to 100 $\mu$ in diameter.

What is claimed is

1. A process for producing from a pitch which forms optically anisotropic micro-spherules when heated in the range of about 350°–500°C a high density isotropic carbonaceous structure constituted of compacted micro-beads comprising the steps of heating said pitch at about 350°–500°C. until said anisotropic spherules form and terminating said heating within said temperature range after about 0.5–6 hours and while said spherules remain in discrete condition, then extracting said heated pitch with an organic solvent of the group consisting of quinoline, pyridine, nitrobenzine, tetrahydrofuran and tar oils, shaping the extracted micro-spherules under pressure into a desired structural shape, and carbonizing the shaped spherules in a non-oxidizing atmosphere.

2. A process for producing from a free-carbon containing pitch which forms into optically anisotropic micro-spherules when heated in the range of about 350°–500°C. a high density isotropic carbonaceous structure constituted of compacted micro-beads comprising the steps of heating said pitch containing free carbon at 350°–500°C. until said optically anisotropic spherules form and terminating said heating within said temperature range after about 0.5–6 hours and while said spherules remain in discrete condition, then extracting said heated pitch with an organic solvent of the group consisting of quinoline, pyridine, nitrobenzine, tetrahydrofuran and tar oils, shaping the extracted micro-spherules under pressure into a desired structural shape, and then carbonizing the shaped spherules in a non-oxidizing atmosphere.

3. A process according to claim 2 wherein said spherules are carbonized at a temperature of at least about 1,500°C whereby said micro-beads have a crystalline graphitic structue.

4. A process according to claim 2, wherein said spherules are carbonized at a temperature below about 1,500°C whereby said micro-beads have a non-graphitic carbonaceous structure.

5. A process according to claim 1 wherein said spherules are carbonized at a temperature of at least about 1,500°C whereby said micro-beads having a crystalline graphitic structure.

6. A process according to claim 1 wherein said spherules are carbonized at a temperature below about 1,500°C whereby said micro-beads have a non-graphitic carbonaceous structure.

7. A process for producing discrete solid carbonaceous micro-beads from a pitch which forms optically anisotropic micro-spherules when heated in the range of about 350°–500°C, comprising the steps of heating said pitch at about 350°–500°C. until said anisotropic spherules form and terminating said heating within said temperature range after about 0.5–6 hours and while said spherules remain in discrete condition, then extracting said heated pitch with an organic solvent of the group consisting of quinoline, pyridine, nitrobenzine, tetrahydrofuran and tar oils until the content of the unspherulized pitch is reduced to not more than about 1%, and thereafter carbonizing the spherules in a non-oxidizing atmosphère into discrete solid carbonaceous micro-beads.

* * * * *